US009163960B2

(12) United States Patent
Rao et al.

(10) Patent No.: US 9,163,960 B2
(45) Date of Patent: Oct. 20, 2015

(54) LONG-DISTANCE POLARIZATION AND PHASE-SENSITIVE OPTICAL TIME-DOMAIN REFLECTOMETRY BASED ON RANDOM LASER AMPLIFICATION

(71) Applicant: University of Electronic Science and Technology of China, Chengdu, Sichuan (CN)

(72) Inventors: Yunjiang Rao, Sichuan (CN); Zinan Wang, Sichuan (CN); Zengling Ran, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 0 days.

(21) Appl. No.: 14/201,915

(22) Filed: Mar. 9, 2014

(65) Prior Publication Data

US 2014/0183360 A1 Jul. 3, 2014

(30) Foreign Application Priority Data

Mar. 12, 2013 (CN) .......................... 2013 1 0078037

(51) Int. Cl.
*G01J 5/00* (2006.01)
*G01D 5/353* (2006.01)
*G01J 1/42* (2006.01)
*G01J 5/10* (2006.01)

(52) U.S. Cl.
CPC ............... *G01D 5/35354* (2013.01); *G01J 1/42* (2013.01); *G01J 5/10* (2013.01)

(58) Field of Classification Search
CPC ...................................... G01J 5/10; G01J 1/42
See application file for complete search history.

(56) References Cited

U.S. PATENT DOCUMENTS

| 6,122,043 | A * | 9/2000 | Barley | 356/73.1 |
|---|---|---|---|---|
| 6,718,076 | B2 * | 4/2004 | Bures et al. | 385/7 |
| 7,085,499 | B2 * | 8/2006 | Yap et al. | 398/183 |
| 2010/0014071 | A1 * | 1/2010 | Hartog | 356/73.1 |
| 2011/0103804 | A1 * | 5/2011 | Uekama | 398/158 |
| 2014/0071456 | A1 * | 3/2014 | Podoleanu et al. | 356/497 |
| 2014/0098362 | A1 * | 4/2014 | Takahashi et al. | 356/73.1 |

OTHER PUBLICATIONS

Yun-Jiang Rao, Xin-Hong Jia, Zi-Nan Wang, Yun Jiang & Wei-Li Zhang, Fully Distributed Amplification Based on Random Distributed Feedback Fiber Laser, 17th Opto-Electronics and Communications Conference (OECC 2012), Jul. 2012, Busan, Korea.
Xin-Hong Jia, Yun-Jiang Rao, Zi-Nan Wang, Wei-Li Zhang, Yun Jiang, Jun-Mei Zhu & Zi-Xin Yang, Towards fully distributed amplification and high-performance long-range distributed sensing based on random fiber laser, OFS-22.
Zinan Wang, Xinhong Jia, Yunjiang Rao, Yun Jiang & Weili Zhang, Novel long-distance fiber-optic sensing systems based on random fiber lasers, Third Asia Pacific Optical Sensors Conference, Proc. of SPIE, 835142, vol. 8351.

\* cited by examiner

*Primary Examiner* — Christine Sung

(57) ABSTRACT

A long-distance polarization and phase-sensitive reflectometry based on random laser amplification for extending a sensing distance includes a long-distance polarization and phase-sensitive reflectometry of a distributed Raman amplification based on optical fiber random lasers generated by unilateral pumps, a long-distance polarization and phase-sensitive reflectometry of a distributed Raman amplification based on optical fiber random lasers generated by bilateral pumps, and a long-distance polarization and phase-sensitive reflectometry of a Raman amplification based on a combination of optical fiber random lasers generated by unilateral pumps and a common Raman pump source, which are applied in optical fiber perturbation sensing and have a capability of greatly improving a working distance of a sensing system and a high practicability.

7 Claims, 2 Drawing Sheets

LONG-DISTANCE POLARIZATION AND PHASE-SENSITIVE OPTICAL TIME-DOMAIN REFLECTOMETRY BASED ON RANDOM LASER AMPLIFICATION

BACKGROUND OF THE PRESENT INVENTION

1. Field of Invention

The present invention relates to a field of optical fiber sensing technology, and more particularly to a long distance polarization and phase-sensitive optical time-domain reflectometry having optical fiber random lasers as a distributed pump source.

2. Description of Related Arts

In the distributed optical fiber transmission technology, the optical fibers are both the transmission medium and the sensing elements; meanwhile, the optical fibers obtain the spatial distribution states of the measured parameters at a whole length of the optical fibers and the information changes of the measured parameters over time, so it is very suitable for the optical fibers to be applied in the safety and protection of long-distance optical cables and the peripheral security based on the optical cables. Because the phase and the polarization state of the light pulses transmitted in the optical fibers are very sensitive to the perturbation of the optical fiber lines, the phase-sensitive optical time-domain reflectometry (-OTDR) and the polarization optical time domain reflectometry (POTDR) which are made according to the feature that the phase and the polarization state of the light pulse transmitted in the optical fibers changes with the line state are able to detect whether the optical fiber lines are perturbed or not, which facilitates the judgment of whether there is anybody approaching the communications cables, so as to accomplish early warning and avoid the destruction of the optical cables to a greatest extent.

The conventional phase-sensitive and polarization optical time-domain reflectometries in a front-end concentrated amplification manner are unable to ensure the measurement accuracy of the optical fiber back-end, which is explained as follows. Firstly, the light power peak of the signal light is prevented to be too high, otherwise unstable modulation, decrease of frequency spectrum broadening caused by the self-phase modulation or decrease of measurement accuracy may be caused. Secondly, the optical fiber loss and the pump consumption effect can affect the measurement resolution of the optical fiber back-end. Thirdly, along with the increasing requirement of spatial resolution, the used pulse width is increasingly narrow, which results in the decrease of the energy carried by the signal pulse to further result in the decrease of the measurement accuracy.

Although the conventional first-order distributed Raman amplification technology is able to improve the spatial distribution uniformity of the optical signals to some extent and ensure the entire consistency of the measurement accuracy, the relative intensity noise RIN of the Raman pump source is usually larger than −100 dBc/Hz; the RIN transfer from the pump to the scattered light becomes an important factor restricting the extension of the sensing distance and the accuracy improvement.

SUMMARY OF THE PRESENT INVENTION

An object of the present invention is to provide a polarization phase-sensitive optical time-domain reflectometry to avoid large noise and a difficulty of ensuring an extension of a sensing distance and measurement accuracy existing in conventional arts, wherein optical fiber random lasers have good stability, small noise, a simple structure and low costs and thus are especially suitable for a long-distance optical transmission, which is taken full advantages by the polarization phase-sensitive optical time-domain reflectometry, so as to accomplish a low-noise distributed optical amplification and effectively extend the sensing distance.

Accordingly, in order to accomplish the above objects, the present invention adopts following technical solutions.

A long-distance polarization and phase-sensitive optical time-domain reflectometry of a distributed Raman amplification based on optical fiber random lasers generated by unilateral pumps, comprises a laser (1), an arbitrary waveform generator (2), an acousto-optic modulator (3), an erbium-doped fiber amplifier (4), a circulator (5), a first 1365 nm pump laser source (6-1), sensing optical fibers (7), a 1455 nm fiber Bragg grating (8-1), a wavelength division multiplexer (9-1), a band-pass filter (10), a 3 dB coupler (11), a polarization beam splitter (12), a photoelectric detector array (13) and a multi-channel A/D data collector (14).

An output terminal of the laser (1) and an input terminal of the acousto-optic modulator (3) are connected. An output terminal of the acousto-optic modulator (3) and an input terminal of the erbium-doped fiber amplifier (4) are connected. An output terminal of the erbium-doped fiber amplifier (4) and a first input terminal of the circulator (5) are connected; a second output port of the circulator (5) is externally connected to a first input terminal of the wavelength division multiplexer (9-1); a public port of the wavelength division multiplexer (9-1) and a first end of the sensing fibers (7) are connected; a second end of the sensing fibers (7) and an input terminal of the 1455 nm fiber Bragg grating (8-1) are connected; an output terminal of a third port of the circulator (5) and an input terminal of the band-pass filter (10) are connected; an output terminal of the band-pass filter (10) and an input terminal of the 3 dB coupler (11) are connected; a first output terminal of the 3 dB coupler (11) is connected to an input terminal of the polarization beam splitter (12) and a second output terminal of the 3 dB coupler (11) is directly connected to the photoelectric detector array (13); one of output terminals of the polarization beam splitter (12) and an input terminal of the photoelectric detector array (13) are connected; an output terminal of the photoelectric detector array (13) and the A/D data collector (14) on PC are connected.

In the long-distance polarization and phase-sensitive optical time-domain reflectometry of the distributed Raman amplification based on the optical fiber random lasers generated by the unilateral pumps, pulse triggers of the externally modulated acousto-optic modulator (3) are generated by the arbitrary waveform generator (2).

In the long-distance polarization and phase-sensitive optical time-domain reflectometry of the distributed Raman amplification based on the optical fiber random lasers generated by the unilateral pumps, the random lasers are generated in the sensing optical fibers (7) via a combination of the first 1365 nm pump laser source (6-1), the sensing optical fibers (7) and the 1455 nm fiber Bragg grating (8-1).

In the long-distance polarization and phase-sensitive optical time-domain reflectometry of the distributed Raman amplification based on the optical fiber random lasers generated by the unilateral pumps, the first 1365 nm pump laser source (6-1) and the 1455 nm fiber Bragg grating (8-1) work at an identical side or at different sides of the sensing fibers; the first 1365 nm pump laser source (6-1) and the 1455 nm fiber Bragg grating (8-1) are provided at a front end or a back end of the sensing optical fibers.

A long-distance polarization and phase-sensitive optical time-domain reflectometry of a distributed Raman amplification based on optical fiber random lasers generated by bilateral pumps, comprises a laser (1), an arbitrary waveform generator (2), an acousto-optic modulator (3), an erbium-doped fiber amplifier (4), a circulator (5), a first 1365 nm pump laser source (6-1), a first fiber Bragg grating (8-1), sensing optical fibers (7), a second fiber Bragg grating (8-2), a second 1365 nm pump laser source (6-2), a band-pass filter (10), a first wavelength division multiplexer (9-1), a second wavelength division multiplexer (9-2), a 3 dB coupler (11), a polarization beam splitter (12), a photoelectric detector array (13) and a multi-channel A/D data collector (14).

The laser (1) is an externally modulated laser. An output terminal of the laser (1) and an input terminal of the acousto-optic modulator (3) are connected. An output terminal of the acousto-optic modulator (3) and an input terminal of the erbium-doped fiber amplifier (4) are connected. An output terminal of the erbium-doped fiber amplifier (4) and a first input terminal of the circulator (5) are connected; a second output port of the circulator (5) is externally connected to a first input terminal of the first wavelength division multiplexer (9-1). A public port of the first wavelength division multiplexer (9-1) is connected to a first port of the first fiber Bragg grating (8-1) and a second port of the first Bragg grating (8-1) is connected to a first end of the sensing optical fibers (7). A second end of the sensing optical fibers (7) is connected to a first end of the second fiber Bragg grating (8-2). A second end of the second fiber Bragg grating (8-2) is connected to an output terminal of the second wavelength division multiplexer (9-2). An output terminal of a third port of the circulator (5) is connected to an input terminal of the band-pass filter (10). An output terminal of the band-pass filter (10) is connected to an input terminal of the 3 dB coupler (11). A first output terminal of the 3 dB coupler (11) is connected to an input terminal of the polarization beam splitter (12) and a second output terminal of the 3 dB coupler (11) is directly connected to the photoelectric detector array (13). One of output terminals of the polarization beam splitter (12) is connected to an input terminal of the photoelectric detector array (13); an output terminal of the photoelectric detector array (13) is connected to the multi-channel A/D data collector (14). A combination of the first 1365 nm pump laser source (6-1), the sensing optical fibers (7), the first fiber Bragg grating (8-1) and the second fiber Bragg grating (8-2) generates random lasers in the sensing optical fibers (7) according to following principles. Rayleigh scattering in the sensing optical fibers (7) functions as a distributed weak reflecting mirror; the fiber Bragg gratings provided at the two ends of the sensing optical fibers function as strong reflecting point mirrors. Under effects of the reflecting mirrors, the 1365 nm pump light and 1455 nm Stokes light triggered by the 1365 nm pump light are transmitted back and forth; when energy of the 1365 nm pump light is strong enough, the 1455 nm Stokes light obtains gain obviously larger than loss during the continual transmission, so as to form stable laser output.

In the long-distance polarization and phase-sensitive optical time-domain reflectometry of the distributed Raman amplification based on the optical fiber random lasers generated by the bilateral pumps, pulse triggers of the externally modulated acousto-optic modulator (3) are generated by the arbitrary waveform generator (2).

In the long-distance polarization and phase-sensitive optical time-domain reflectometry of the distributed Raman amplification based on the optical fiber random lasers generated by the bilateral pumps, the random lasers are generated in the sensing optical fibers via a combination of the first 1365 nm pump laser source (6-1), the sensing optical fibers (7), the first fiber Bragg grating (8-1) and the second fiber Bragg grating (8-2).

In the long-distance polarization and phase-sensitive optical time-domain reflectometry of the distributed Raman amplification based on the optical fiber random lasers generated by the bilateral pumps, preferably additional fiber Bragg gratings are provided between the first wavelength division multiplexer (9-1) and the second wavelength division multiplexer (9-2) and a difference of central wavelength between the fiber Bragg gratings is between 1~10 nm.

A long-distance polarization and phase-sensitive optical time-domain reflectometry of an amplification based on a combination of optical fiber random lasers generated by unilateral pumps and a common Raman pump source, comprises a laser (1), an arbitrary waveform generator (2), an acousto-optic modulator (3), an erbium-doped fiber amplifier (4), a circulator (5), a 1455 nm pump laser source (8-3), sensing optical fibers (7), a 1455 nm fiber Bragg grating (8-1), a 1365 nm pump laser source (6-1), a band-pass filter (10), a first wavelength division multiplexer (9-1), a second wavelength division multiplexer (9-2), a 3 dB coupler (11), a polarization beam splitter (12), a photoelectric detector array (13) and a multi-channel A/D data collector (14).

The laser (1) is an externally modulated laser. An output terminal of the laser (1) and an input terminal of the acousto-optic modulator (3) are connected; an output terminal of the acousto-optic modulator (3) and an input terminal of the erbium-doped fiber amplifier (4) are connected. An output terminal of the erbium-doped fiber amplifier (4) and a first input terminal of the circulator (5) are connected; a second output port of the circulator (5) is externally connected to a first input terminal of the wavelength division multiplexer (9-1). A public port of the wavelength division multiplexer (9-1) and a first end of the sensing optical fibers (7) are connected; a second end of the sensing optical fibers (7) and a first end of the 1455 nm fiber Bragg grating (8-1). A second end of the 1455 fiber Bragg grating (8-1) and an output terminal of the second wavelength division multiplexer (9-2) are connected. An output terminal of a third port of the circulator (5) and an input terminal of the band-pass filter (10). An output terminal of the band-pass filter (10) and an input terminal of the 3 dB coupler (11) are connected. A first output terminal of the 3 dB coupler (11) and an input terminal of the polarization beam splitter (12) are connected; a second output terminal of the 3 dB coupler (11) is directly connected to the photoelectric detector array (13). One of output terminals of the polarization beam splitter (12) and an input terminal of the photoelectric detector array (13) are connected. An output terminal of the photoelectric detector array (13) and the multi-channel A/D data collector (14) are connected.

In the long-distance polarization and phase-sensitive optical time-domain reflectometry of the amplification based on the combination of the optical fiber random lasers generated by the unilateral pumps and the common Raman pump source, the random lasers are generated in the sensing optical fibers via a combination of the 1365 nm pump laser source (6-1), the sensing optical fibers (7) and the 1455 nm fiber Bragg grating (8-1); then the random lasers and the common Raman pump light together amplify the signal light.

In the long-distance polarization and phase-sensitive optical time-domain reflectometry of the amplification based on the combination of the optical fiber random lasers generated by the unilateral pumps and the common Raman pump source, a difference between a wavelength of the common Raman pump source and the wavelength of the pump laser source generating the optical fiber random lasers is the wavelength of one Raman frequency-shift.

In the long-distance polarization and phase-sensitive optical time-domain reflectometry of the amplification based on the combination of the optical fiber random lasers generated by the unilateral pumps and the common Raman pump source, the 1365 nm pump laser (6-1) and the 1455 nm fiber Bragg grating (8-1) are provided at an identical side of the sensing optical fibers (7); the 1455 nm pump laser source (8-3) is provided at an opposite side thereof.

A measuring method, provided by the present invention, comprises steps of:
  (a) injecting pulse signal light into optical fibers;
  (b) injecting pump light into sensing optical fibers, for amplifying the pulse signal light;
  (c) receiving Rayleigh backscattering light of the signal light;
  (d) dividing the Rayleigh backscattering light into two beams, for respectively collecting polarization-sensitive data and collecting phase-sensitive data; and
  (e) according to distortion points of the polarization-sensitive data and the phase-sensitive data, determining perturbation and correspondent perturbed positions.

Compared with the conventional arts, the long-distance polarization and phase-sensitive optical time-domain reflectometries provided by the present invention avoid the large noise and the difficulty of ensuring the extension of the sensing distance and the measurement accuracy, takes full advantages of the random lasers which have the good stability, the small noise, the simple structure and the low costs and thus are especially suitable for the long-distance optical transmission, so as to accomplish the low-noise distributed optical amplification and effectively extend the sensing distance.

These and other objectives, features, and advantages of the present invention will become apparent from the following detailed description, the accompanying drawings, and the appended claims.

1-laser; 2-arbitrary waveform generator; 3-acousto-optic modulator; 4-erbium-doped fiber amplifier; 5-circulator; 6-1-first 1365 nm pump laser source; 6-2-second 1365 nm pump laser source; 7-sensing optical fibers; 8-1-1455 nm fiber Bragg grating; 8-2-second fiber Bragg grating; 8-3-1455 nm pump laser source; 9-1-wavelength division multiplexer; 9-2-second wavelength division multiplexer; 10-band-pass filter; 11-3 dB coupler; 12-polarization beam splitter; 13-photoelectric detector array; and 14-multi-channel A/D data collector.

DETAILED DESCRIPTION OF THE PREFERRED EMBODIMENT

Figure 1:
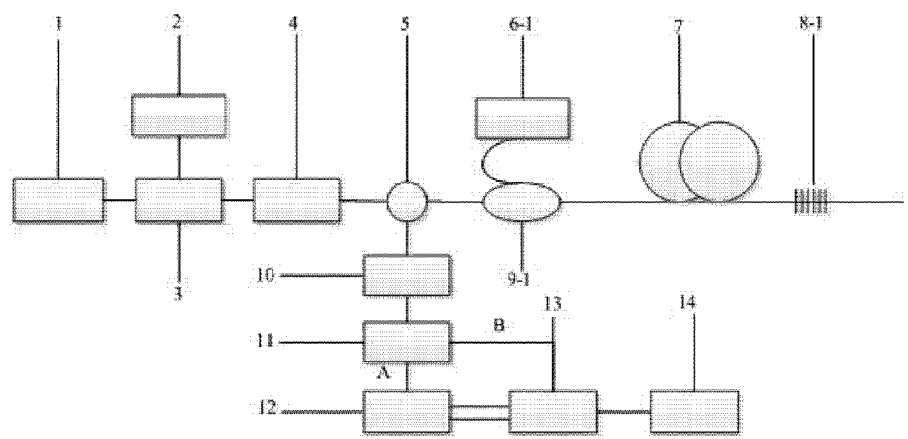
FIG. 1 is a block diagram of a long-distance polarization and phase-sensitive optical time-domain reflectometry of a distributed Raman amplification based on optical fiber random lasers generated by unilateral pumps according to a preferred embodiment of the present invention.
Figure 2:
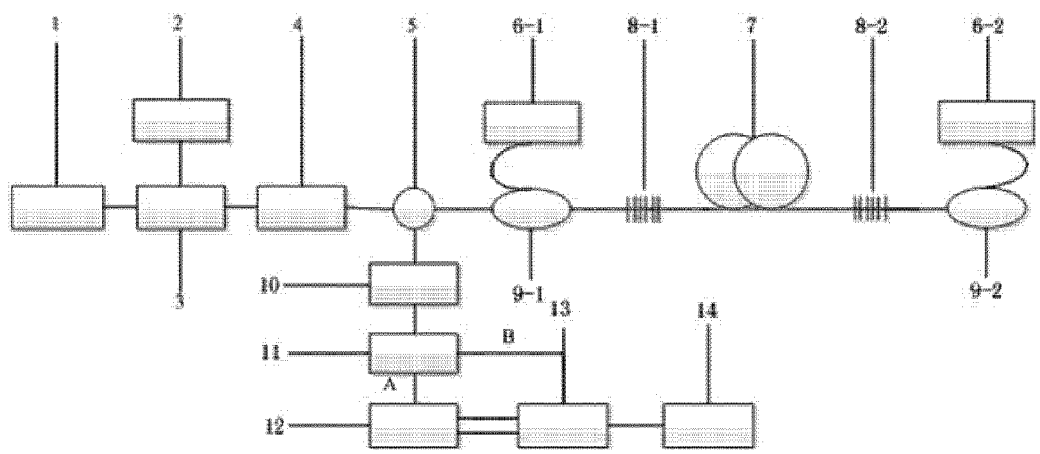
FIG. 2 is a block diagram of a long-distance polarization and phase-sensitive optical time-domain reflectometry of a distributed Raman amplification based on optical fiber random lasers generated by bilateral pumps according to the preferred embodiment of the present invention.

Referring to FIG. 2 of the drawings, according to a preferred embodiment of the present invention, a long-distance polarization and phase-sensitive optical time-domain reflectometry of a distributed Raman amplification based on optical fiber random lasers generated by bilateral pumps, comprises a laser (1), an arbitrary waveform generator (2), an acousto-optic modulator (3), an erbium-doped fiber amplifier (4), a circulator (5), a first 1365 nm pump laser source (6-1), a first fiber Bragg grating (8-1), sensing optical fibers (7), a second fiber Bragg grating (8-2), a second 1365 nm pump laser source (6-2), a band-pass filter (10), a first wavelength division multiplexer (9-1), a second wavelength division multiplexer (9-2), a 3 dB coupler (11), a polarization beam splitter (12), a photoelectric detector array (13) and a multi-channel A/D data collector (14).

The laser (1) is an externally modulated laser. An output terminal of the laser (1) and an input terminal of the acousto-optic modulator (3) are connected. An output terminal of the acousto-optic modulator (3) and an input terminal of the erbium-doped fiber amplifier (4) are connected. An output terminal of the erbium-doped fiber amplifier (4) and a first input terminal of the circulator (5) are connected; a second output port of the circulator (5) is externally connected to a first input terminal of the first wavelength division multiplexer (9-1). A public port of the first wavelength division multiplexer (9-1) is connected to a first port of the first fiber Bragg grating (8-1) and a second port of the first Bragg grating (8-1) is connected to a first end of the sensing optical fibers (7). A second end of the sensing optical fibers (7) is connected to a first end of the second fiber Bragg grating (8-2). A second end of the second fiber Bragg grating (8-2) is connected to an output terminal of the second wavelength division multiplexer (9-2). An output terminal of a third port of the circulator (5) is connected to an input terminal of the band-pass filter (10). An output terminal of the band-pass filter (10) is connected to an input terminal of the 3 dB coupler (11). A first output terminal of the 3 dB coupler (11) is connected to an input terminal of the polarization beam splitter (12) and a second output terminal of the 3 dB coupler (11) is directly connected to the photoelectric detector array (13). One of output terminals of the polarization beam splitter (12) is connected to an input terminal of the photoelectric detector array (13); an output terminal of the photoelectric detector array (13) is connected to the multi-channel A/D data collector (14).

In the long-distance polarization and phase-sensitive optical time-domain reflectometry of the distributed Raman amplification based on the optical fiber random lasers generated by the bilateral pumps, pulse triggers of the externally modulated acousto-optic modulator (3) are generated by the arbitrary waveform generator (2).

In the long-distance polarization and phase-sensitive optical time-domain reflectometry of the distributed Raman amplification based on the optical fiber random lasers generated by the bilateral pumps, the bilateral pump random lasers are generated in the sensing optical fibers via a combination of the first 1365 nm pump laser source (6-1), the sensing optical fibers (7), the first fiber Bragg grating (8-1), the second fiber Bragg grating (8-2), the first wavelength division multiplexer (9-1) and the second wavelength division multiplexer (9-2). The externally modulated acousto-optic modulator (3) has a high extinction ratio; the pulse triggers of the acousto-optic modulator (3) are generated by the arbitrary waveform generator (2) which drives the acousto-optic modulator (3).

In the long-distance polarization and phase-sensitive optical time-domain reflectometry of the distributed Raman amplification based on the optical fiber random lasers generated by the bilateral pumps, the 1365 nm pump light is coupledly inputted into the two ends of the sensing optical fibers (7) via the wavelength division multiplexers; meanwhile, additional two fiber Bragg gratings having working wavelengths around 1455 nm and a wavelength difference between 1~10 nm can be provided between the wavelength division multiplexers which are provided at the two ends and at the two sides of the sensing optical fibers (7). When a system pump light intensity is larger than a certain threshold value, a super-long-distance random laser is formed and then the random optical fiber laser is able to effectively amplify the signal light.

In the long-distance polarization and phase-sensitive optical time-domain reflectometry of the distributed Raman amplification based on the optical fiber random lasers generated by the bilateral pumps, the output terminal of the third port of the circulator (5) is connected to the input terminal of the band-pass filter (10); the output terminal of the band-pass filter (10) is connected to the input terminal of the 3 dB coupler (11); the output terminal of the 3 dB coupler (11) is connected to the input terminal of the polarization beam splitter (12); the output terminal of the polarization beam splitter (15) is connected to the input terminal of the photoelectric detector array (13); the output terminal of the photoelectric detector array (13) is connected to the multi-channel A/D data collector (14), in such a manner that polarization-sensitive data and phase-sensitive data are respectively collected.

Figure 3:
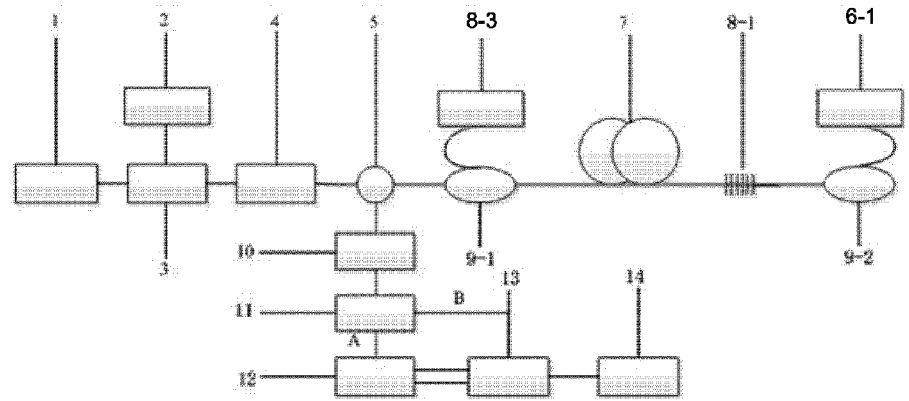
FIG. 3 is a block diagram of a long-distance polarization and phase-sensitive optical time-domain reflectometry of an amplification based on a combination of optical fiber random lasers generated by unilateral pumps and common Raman pump sources according to the preferred embodiment of the present invention.
Figure 4:
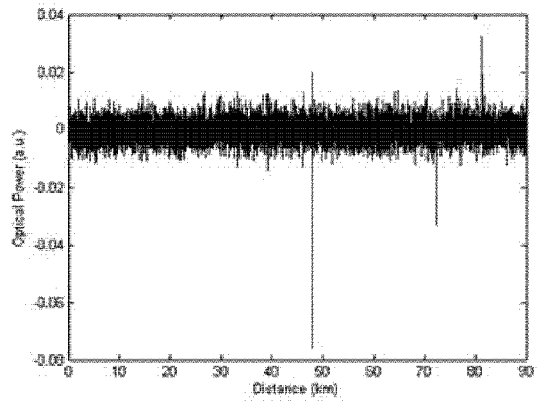
FIG. 4 is a diagram of detection results of detected phase-sensitive signals when three perturbation points simultaneously emerge according to the preferred embodiments of the present invention.
Figure 5:
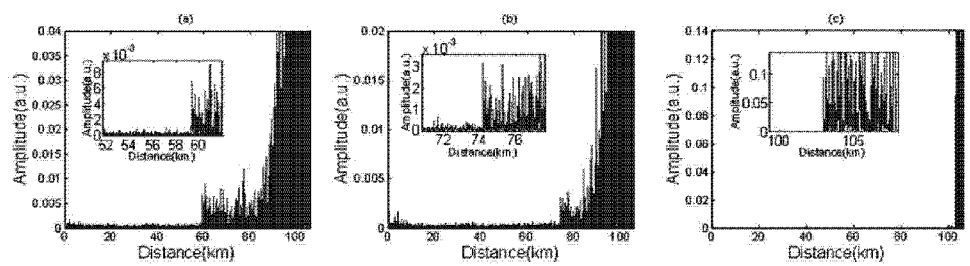
FIG. 5 is a diagram of detection results of polarization-sensitive signals when perturbation signals emerge at different positions, wherein (a) 59.3 km; (b) 74.2 km; and (c) 103.3 km, according to the preferred embodiments of the present invention.

Referring to FIG. 3 of the drawings, according to the preferred embodiment of the present invention, a long-distance polarization and phase-sensitive optical time-domain reflectometry of an amplification based on a combination of optical fiber random lasers generated by unilateral pumps and a common Raman pump source, comprises a laser (1), an arbitrary waveform generator (2), an acousto-optic modulator (3), an erbium-doped fiber amplifier (4), a circulator (5), a 1455 nm pump laser source (8-3), sensing optical fibers (7), a 1455 nm fiber Bragg grating (8-1), a 1365 nm pump laser source (6-1), a band-pass filter (10), a first wavelength division multiplexer (9-1), a second wavelength division multiplexer (9-2), a 3 dB coupler (11), a polarization beam splitter (12), a photoelectric detector array (13) and a multi-channel A/D data collector (14).

The laser (1) is an externally modulated laser. An output terminal of the laser (1) and an input terminal of the acousto-optic modulator (3) are connected; an output terminal of the acousto-optic modulator (3) and an input terminal of the erbium-doped fiber amplifier (4) are connected. An output terminal of the erbium-doped fiber amplifier (4) and a first input terminal of the circulator (5) are connected; a second output port of the circulator (5) is externally connected to a first input terminal of the wavelength division multiplexer (9-1). A public port of the wavelength division multiplexer (9-1) and a first end of the sensing optical fibers (7) are connected; a second end of the sensing optical fibers (7) and a first end of the 1455 nm fiber Bragg grating (8-1). A second end of the 1455 fiber Bragg grating (8-1) and an output terminal of the second wavelength division multiplexer (9-2) are connected. An output terminal of a third port of the circulator (5) and an input terminal of the band-pass filter (10). An output terminal of the band-pass filter (10) and an input terminal of the 3 dB coupler (11) are connected. A first output terminal of the 3 dB coupler (11) and an input terminal of the polarization beam splitter (12) are connected; a second output terminal of the 3 dB coupler (11) is directly connected to the photoelectric detector array (13). One of output terminals of the polarization beam splitter (12) and an input terminal of the photoelectric detector array (13) are connected. An output terminal of the photoelectric detector array (13) and the multi-channel A/D data collector (14) are connected.

In the long-distance polarization and phase-sensitive optical time-domain reflectometry of the amplification based on the combination of the optical fiber random lasers generated by the unilateral pumps and the common Raman pump source, the random lasers are generated in the sensing optical fibers via a combination of the 1365 nm pump laser source (6-1), the sensing optical fibers (7) and the 1455 nm fiber Bragg grating (8-1); then the random lasers and the common Raman pump light together amplify the signal light.

In the long-distance polarization and phase-sensitive optical time-domain reflectometry of the amplification based on the combination of the optical fiber random lasers generated by the unilateral pumps and the common Raman pump source, a difference between a wavelength of the common Raman pump source and the wavelength of the pump laser source generating the optical fiber random lasers is the wavelength of one Raman frequency-shift.

In the long-distance polarization and phase-sensitive optical time-domain reflectometry of the amplification based on the combination of the optical fiber random lasers generated by the unilateral pumps and the common Raman pump source, the 1365 nm pump laser (6-1) and the 1455 nm fiber Bragg grating (8-1) are provided at an identical side of the sensing optical fibers (7); the 1455 nm pump laser source (8-3) is provided at an opposite side thereof.

According to the preferred embodiment of the present invention, a measuring method comprises steps of:
  (a) injecting pulse signal light into optical fibers;
  (b) injecting pump light into sensing optical fibers, for amplifying the pulse signal light;
  (c) receiving Rayleigh backscattering light of the signal light;
  (d) dividing the Rayleigh backscattering light into two beams, for respectively collecting polarization-sensitive data and collecting phase-sensitive data; and
  (e) according to distortion points of the polarization-sensitive data and the phase-sensitive data, determining perturbation and correspondent perturbed positions.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A long-distance polarization and phase-sensitive optical time-domain reflecometer of a distributed Raman amplification based on optical fiber random lasers generated by unilateral pumps, comprising:

a laser, an acousto-optic modulator, an arbitrary waveform generator for supplying said acousto-optic modulator with triggering pulses, an erbium-doped fiber amplifier, a circulator, a 1365 nm pump laser source, sensing optical fibers, a 1455 nm fiber Bragg grating, a wavelength division multiplexer, a band-pass filter, a 3 dB coupler, a polarization beam splitter, a photoelectric detector array and a multi-channel A/D data collector, wherein an output terminal of said laser and an input terminal of said acousto-optic modulator are connected; an output terminal of said acousto-optic modulator and an input terminal of said erbium-doped fiber amplifier are connected; an output terminal of said erbium-doped fiber amplifier and a first input terminal of said circulator are connected; a second output port of said circulator and a first input terminal of said wavelength division multiplexer are connected; a public port of said wavelength division multiplexer and a first end of said sensing optical fibers are connected; a second end of said sensing optical fibers and an input terminal of said 1455 nm fiber Bragg grating are connected; an output terminal of a third port of said circulator and an input terminal of said band-pass filter are connected; an output terminal of said band-pass filter and an input terminal of said 3 dB coupler; a first output terminal of said 3 dB coupler and an input terminal of said polarization beam splitter are connected; a second output terminal of said 3 dB coupler is directly connected to said photoelectric detector array; one of output terminals of said polarization beam splitter is connected to an input terminal of said photoelectric detector array; an output terminal of said photoelectric detector array and said multi-channel A/D data collector on PC are connected; and said random lasers are generated in said sensing optical fibers via a combination of said 1365 nm pump laser source, said sensing optical fibers and said 1455 nm fiber Bragg grating.

2. The long-distance polarization and phase-sensitive optical time-domain reflecometer, as recited in claim 1, wherein said 1365 nm pump laser source and said 1455 nm fiber Bragg grating are provided at an identical side or at different sides of said sensing optical fibers; said 1365 nm pump laser source and said 1455 nm fiber Bragg grating are provided at a front end or at a back end of said sensing optical fibers.

3. A long-distance polarization and phase-sensitive optical time-domain reflectometry of a distributed Raman amplification based on optical fiber random lasers generated by bilateral pumps, comprising:

a laser, an acousto-optic modulator, an arbitrary waveform generator for supplying said acousto-optic modulator with triggering pulses, an erbium-doped fiber amplifier, a circulator, a first 1365 nm pump laser source, a first fiber Bragg grating, sensing optical fibers, a second fiber Bragg grating, a second 1365 nm pump laser source, a band-pass filter, a first wavelength division multiplexer, a second wavelength division multiplexer, a 3 dB coupler, a polarization beam splitter, a photoelectric detector array and a multi-channel A/D data collector, wherein said laser is an externally modulated laser; an output terminal of said laser and an input terminal of said acousto-optic modulator are connected; an output terminal of said acousto-optic modulator and an input terminal of said erbium-doped fiber amplifier are connected; an output terminal of said erbium-doped fiber amplifier and a first input terminal of said circulator are connected; a second output port of said circulator is externally connected to a first input terminal of said first wavelength division multiplexer; a public port of said first wavelength division multiplexer and a first port of said first fiber Bragg grating are connected; a second port of said first Bragg grating and a first end of said sensing optical fibers are connected; a second end of said sensing optical fibers and a first end of said second fiber Bragg grating are connected; a second end of said second fiber Bragg grating and an output terminal of said second wavelength division multiplexer are connected; an output terminal of a third port of said circulator and an input terminal of said band-pass filter are connected; an output terminal of said band-pass filter and an input terminal of said 3 dB coupler are connected; a first output terminal of said 3 dB coupler and an input terminal of said polarization beam splitter are connected; a second output terminal of said 3 dB coupler is directly connected to said photoelectric detector array; one of output terminals of said polarization beam splitter and an input terminal of said photoelectric detector array are connected; an output terminal of said photoelectric detector array and said multi-channel A/D data collector are connected; and said random lasers are generated in said sensing optical fibers via a combination of said 1365 nm pump laser source, said sensing optical fibers, said first fiber Bragg grating and said second fiber Bragg grating, wherein:

said 1455 nm Stokes light is triggered by 1365 nm pump light; Rayleigh scattering in said sensing optical fibers functions as a distributed weak reflecting mirror and— said fiber Bragg gratings provided at said two ends of said sensing optical fibers function as strong reflecting point mirrors; said 1455 nm Stokes light is reflected by said distributed weak reflecting mirror in said sensing optical fibers and said fiber Bragg gratings provided at said two ends of said sensing optical fibers, and thus transmitted back and forth in said sensing optical fibers; and when energy of said 1365 nm pump light is strong enough, said 1455 Stokes light obtains gain obviously larger than loss during said continual transmission, so as to form stable laser output.

4. The long-distance polarization and phase-sensitive optical time-domain reflectometry, as recited in claim 3, wherein additional fiber Bragg gratings are provided between said wavelength division multiplexers provided at said two ends of said sensing optical fibers; a central wavelength difference between said additional fiber Bragg gratings is between 1~10 nm.

5. A long-distance polarization and phase-sensitive optical time-domain reflectometry of an amplification based on a combination of optical fiber random lasers generated by unilateral pumps and a common Raman pump source, comprising:

a laser, an acousto-optic modulator, an arbitrary waveform generator for supplying said acousto-optic with triggering pulses, an erbium-doped fiber amplifier, a circulator, a 1455 nm pump laser source, sensing optical fibers, a 1455 nm fiber Bragg grating, a 1365 nm pump laser source, a band-pass filter, a first wavelength division multiplexer, a second wavelength division multiplexer, a 3 dB coupler, a polarization beam splitter, a photoelectric detector array and a multi-channel A/D data collector, wherein said laser is an externally modulated laser; an output terminal of said laser and an input terminal of said acousto-optic modulator are connected; an output terminal of said acousto-optic modulator and an input terminal of said erbium-doped fiber amplifier are connected; an output terminal of said erbium-doped fiber amplifier and a first input terminal of said circulator are connected; a second output port of said circulator is externally connected to a first input terminal of said first wavelength division multiplexer; a public port of said first wavelength division multiplexer and a first end of said sensing optical fibers are connected; a second end of said sensing optical fibers and a first end of said 1455 nm fiber Bragg grating are connected; a second end of said 1455 nm fiber Bragg grating and an output terminal of said second wavelength division multiplexer are connected; an output terminal of a third port of said circulator and an input terminal of said band-pass filter are connected; an output terminal of said band-pass filter and an input terminal of said 3 dB coupler are connected; a first output terminal of said 3 dB coupler and an input terminal of said polarization beam splitter are connected; a second output terminal of said 3 dB coupler is directly connected to said photoelectric detector array; one of output terminals of said polarization beam splitter and an input terminal of said photoelectric detector array are connected; an output terminal of said photoelectric detector array and said multi-channel A/D data collector are connected; said random lasers are generated in said sensing optical fibers via a combination of said 1365 nm pump laser source, said sensing optical fibers and said 1455 nm fiber Bragg grating; then said random lasers and said common Raman pump source together amplify signal light.

6. The long-distance polarization and phase-sensitive optical time-domain reflectometry, as recited in claim 5, wherein a wavelength difference between said common Raman pump source and said pump laser source which generates said optical fiber random lasers is the wavelength of one Raman frequency-shift.

7. The long-distance polarization and phase-sensitive optical time-domain reflectometry, as recited in claim 5, wherein said 1365 nm pump laser source and said 1455 nm fiber Bragg grating are provided at an identical side of said sensing optical fibers; said 1455 nm pump laser source is provided at an opposite side thereof.

\* \* \* \* \*